US010942925B1

(12) United States Patent
Cruanes et al.

(10) Patent No.: US 10,942,925 B1
(45) Date of Patent: *Mar. 9, 2021

(54) DATABASE QUERY PROCESSING USING A PRUNING INDEX

(71) Applicant: Snowflake Inc., San Mateo, CA (US)

(72) Inventors: Thierry Cruanes, San Mateo, CA (US); Benoit Dageville, San Mateo, CA (US); Ismail Oukid, Berlin (DE); Stefan Richter, Berlin (DE)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,462

(22) Filed: Jul. 17, 2020

Related U.S. Application Data

(63) Continuation of application No. 16/727,315, filed on Dec. 26, 2019, now Pat. No. 10,769,150.

(51) Int. Cl.

| | |
|---|---|
| ***G06F 16/20*** | (2019.01) |
| ***G06F 16/2455*** | (2019.01) |
| ***G06F 16/9035*** | (2019.01) |
| ***G06F 16/28*** | (2019.01) |
| ***G06F 16/22*** | (2019.01) |
| ***G06F 17/18*** | (2006.01) |

(52) U.S. Cl.
CPC .... *G06F 16/24557* (2019.01); *G06F 16/2272* (2019.01); *G06F 16/283* (2019.01); *G06F 16/9035* (2019.01); *G06F 17/18* (2013.01)

(58) Field of Classification Search
CPC .. G06F 16/211; G06F 16/2282; G06F 16/245; G06F 16/285; G06F 16/2455; G06F 2212/1044; G06F 16/2272; G06F 16/24557; G06F 16/283; G06F 16/9035
See application file for complete search history.

(56) References Cited

U.S. PATENT DOCUMENTS 6,154,572 A * 11/2000 Chaddha ............ H03M 7/3082 375/E7.049
6,374,232 B1 * 4/2002 Dageville ........... G06F 16/2246
6,957,225 B1 * 10/2005 Zait ..................... G06F 16/2264
10,025,823 B2 * 7/2018 Das .................. G06F 16/24544
(Continued)

OTHER PUBLICATIONS

"International Application Serial No. PCT/US2020/044199, International Search Report dated Aug. 26, 2020", 2 pgs.
(Continued)

*Primary Examiner* — Merilyn P Nguyen
(74) *Attorney, Agent, or Firm* — Schwegman Lundberg & Woessner, P.A.

(57) ABSTRACT

A source table organized into a set of micro-partitions is accessed by a network-based data warehouse. A pruning index is generated based on the source table. The pruning index comprises a set of filters that indicate locations of distinct values in each column of the source table. A query directed at the source table is received at the network-based data warehouse. The query is processed using the pruning index. The processing of the query comprises pruning the set of micro-partitions of the source table to scan for data matching the query, the pruning of the plurality of micro-partitions comprising identifying, using the pruning index, a sub-set of micro-partitions to scan for the data matching the query.

30 Claims, 14 Drawing Sheets

(56) References Cited

U.S. PATENT DOCUMENTS

| | | | |
|---|---|---|---|
| 10,628,418 | B2 | 4/2020 | Weyerhaeuser et al. |
| 10,769,150 | B1 | 9/2020 | Cruanes et al. |
| 2013/0166553 | A1* | 6/2013 | Yoon ..................... G06F 16/245 707/737 |
| 2013/0166557 | A1 | 6/2013 | Fricke et al. |
| 2014/0365424 | A1* | 12/2014 | Herbst .............. H04W 52/0209 707/607 |
| 2015/0286681 | A1* | 10/2015 | Baer ................. G06F 16/24554 707/754 |
| 2016/0026667 | A1 | 1/2016 | Mukherjee et al. |
| 2016/0162364 | A1* | 6/2016 | Mutha ................. G06F 11/3476 707/645 |
| 2016/0350347 | A1 | 12/2016 | Das et al. |
| 2016/0350392 | A1* | 12/2016 | Rice .................... G06F 16/2282 |
| 2017/0139989 | A1* | 5/2017 | Weyerhaeuser .. G06F 16/24537 |
| 2018/0068008 | A1 | 3/2018 | Cruanes et al. |
| 2020/0026788 | A1* | 1/2020 | Bellamkonda ........ G06F 9/5066 |

OTHER PUBLICATIONS

"International Application Serial No. PCT/US2020/044199, Written Opinion dated Aug. 26, 2020", 6 pgs.
"U.S. Appl. No. 16/727,315, Examiner Interview Summary dated Jun. 2, 2020", 3 pgs.
"U.S. Appl. No. 16/727,315, Non Final Office Action dated Mar. 2, 2020".
"U.S. Appl. No. 16/727,315, Notice of Allowance dated Jun. 8, 2020", 9 pgs.
"U.S. Appl. No. 16/727,315, Response Filed May 27, 2020 to Non Final Office Action dated Mar. 2, 2020".

* cited by examiner

500

| PARTITION# (4 BYTES) 502 | SLICE NUMBER 504 | SUMMARY TYPE (1 BYTE) 506 | HASH # (1 BYTE) 508 | BLOOM[0] (8 BYTES) | • • • | BLOOM[N] (8 BYTES) |
|---|---|---|---|---|---|---|
| P000 | 0 | B | 20 | 00101 | | 0101 |
| P002 | 0 | B | 20 | 10010 | | 1110 |
| • • • | | | | | | |
| P1001 | 0 | B | 20 | 00101 | | 0011 |
| P1001 | 0 | B | 20 | 10010 | | 1100 |

510 (BLOOM[0] … BLOOM[N])

*FIG. 5*

DATABASE QUERY PROCESSING USING A PRUNING INDEX

CROSS-REFERENCE TO RELATED APPLICATION

This application is a Continuation of U.S. patent application Ser. No. 16/727,315, filed Dec. 26, 2019, the contents of which are incorporated herein by referenced in their entirety.

TECHNICAL FIELD

Embodiments of the disclosure relate generally to databases and, more specifically, to generating and using pruning indexes to enhance database query processing in a cloud data warehouse system.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud data warehouse (also referred to as a "network-based data warehouse" or simply as a "data warehouse") is a network-based system used for data analysis and reporting that comprises a central repository of integrated data from one or more disparate sources. A cloud data warehouse can store current and historical data that can be used for creating analytical reports for an enterprise based on data stored within databases of the enterprise. To this end, data warehouses typically provide business intelligence tools, tools to extract, transform, and load data into the repository, and tools to manage and retrieve metadata.

When certain information is to be extracted from a database, a query statement may be executed against the database data. A cloud data warehouse system processes the query and returns certain data according to one or more query predicates that indicate what information should be returned by the query. The data warehouse system extracts specific data from the database and formats that data into a readable form. However, it can be challenging to execute queries on a very large table because a significant amount of time and computing resources are required to scan an entire table to identify data that satisfies the query.

BRIEF DESCRIPTION OF THE DRAWINGS

The present disclosure will be understood more fully from the detailed description given below and from the accompanying drawings of various embodiments of the disclosure.

FIG. 5 illustrates a portion of an example pruning index, in accordance with some embodiments of the present disclosure.

DETAILED DESCRIPTION

Figure 1:
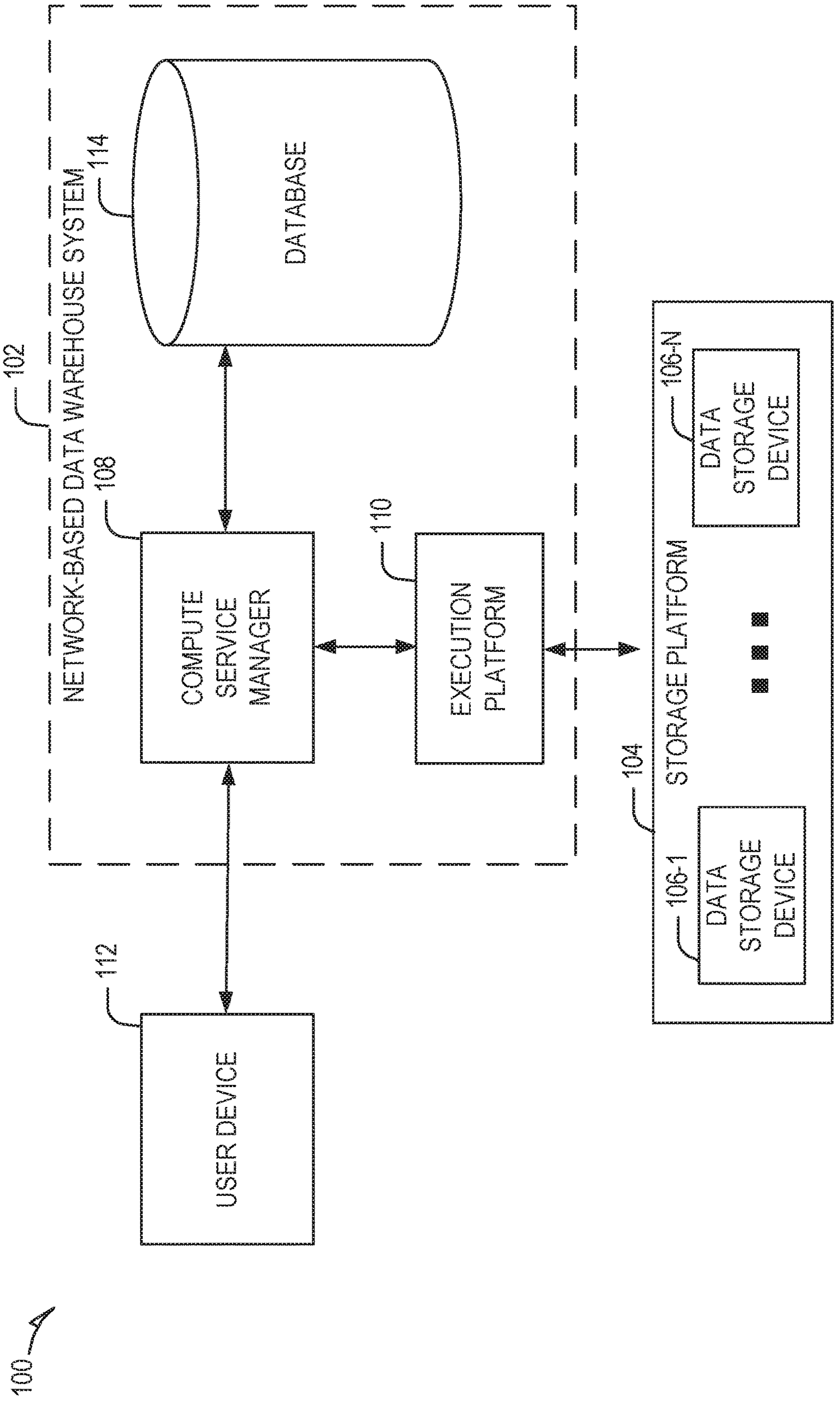
FIG. 1 illustrates an example computing environment that includes a network-based data warehouse system in communication with a cloud storage provider system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, processing queries directed to very large tables is challenging because a significant amount of time and computing resources are required to scan an entire table to identify data that satisfies the query. Therefore, it can be desirable to execute a query without scanning the entire table. Aspects of the present disclosure address the above and other challenges in processing queries on large tables by creating a pruning index that may be used to construct a reduced scan set for processing a query. More specifically, a large source table may be organized into a set of micro-partitions, and a pruning index can be created for the source table to be used in identifying a sub-set of the micro-partitions to scan to identify data that satisfies the query.

As discussed herein, a "micro-partition" is a batch unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allows for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

Consistent with some embodiments, a network-based data warehouse system may generate a pruning index for a source table and use the pruning index to prune micro-partitions of the source table when processing queries directed to the source table. In generating a pruning index, the network-based data warehouse system generates a filter for each micro-partition of the source table that indexes distinct values in each column of the micro-partition of the source table. The filter may, for example, comprise a blocked bloom filter, a bloom filter, a hash filter, or a cuckoo filter.

When a query comprising an equality predicate is received, rather than scanning the entire source table to evaluate the equality predicate, the network-based data warehouse system probes the pruning index to identify a reduced scan set of micro-partitions comprising only a sub-set of the micro-partitions of the source table, and only the reduced scan set of micro-partitions is scanned when executing the query.

By using a pruning index to prune the set of micro-partitions to scan in executing a query, the network-based data warehouse accelerates the execution of point queries on large tables when compared to conventional methodologies. Using a pruning index in this manner also guarantees a constant overhead for any equality predicate on the table. Additional benefits of pruning index utilization in data warehouses include, but are not limited to, an ability to support other types of predicates, an ability to quickly compute the number of distinct values in a table, and the ability to support join pruning.

FIG. 1 illustrates an example computing environment 100 that includes a network-based data warehouse system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the network-based data warehouse system 102 and a storage platform 104 (e.g., AWS®, Microsoft Azure Blob Storage®, or Google Cloud Storage®). The network-based data warehouse system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the network-based data warehouse system 102.

The network-based data warehouse system 102 comprises a compute service manager 108, an execution platform 110, and a database 114. The network-based data warehouse system 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a user device 112. The user device 112 corresponds to a user of one of the multiple client accounts supported by the network-based data warehouse system 102. In some embodiments, the compute service manager 108 does not receive any direct communications from the user device 112 and only receives communications concerning jobs from a queue within the network-based data warehouse system 102.

The compute service manager 108 is also coupled to database 114, which is associated with the data stored in the computing environment 100. The database 114 stores data pertaining to various functions and aspects associated with the network-based data warehouse system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

For example, the database 114 can include one or more pruning indexes. The compute service manager 108 may generate a pruning index for each source table accessed from the storage platform 104 and use a pruning index to prune the set of micro-partitions of a source table to scan for data in executing a query. That is, given a query directed at a source table organized into a set of micro-partitions, the computing service manger 108 can access a pruning index from the database 114 and use the pruning index to identify a reduced set of micro-partitions to scan in executing the query. The set of micro-partitions to scan in executing a query may be referred to herein as a "scan set."

In some embodiments, the compute service manager 108 may determine that a job should be performed based on data from the database 114. In such embodiments, the compute service manager 108 may scan the data and determine that a job should be performed to improve data organization or database performance. For example, the compute service manager 108 may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager 108 may determine that a job should be performed. In some embodiments, the compute service manager 108 determines that a job should be performed based on a trigger event and stores the job in a queue until the compute service manager 108 is ready to schedule and manage the execution of the job. In an embodiment of the disclosure, the compute service manager 108 determines whether a table or pruning index needs to be reclustered based on one or more DML commands being performed, wherein one or more of DML commands constitute the trigger event.

The compute service manager 108 is further coupled to the execution platform 110, which provides multiple computing resources that execute various data storage and data retrieval tasks. The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (e.g., Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the network-based data warehouse system 102 based on the changing data storage/retrieval needs as well as the changing needs of the users and systems. The support of dynamic changes allows the network-based data warehouse system 102 to scale quickly in response to changing demands on the systems and components within the network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
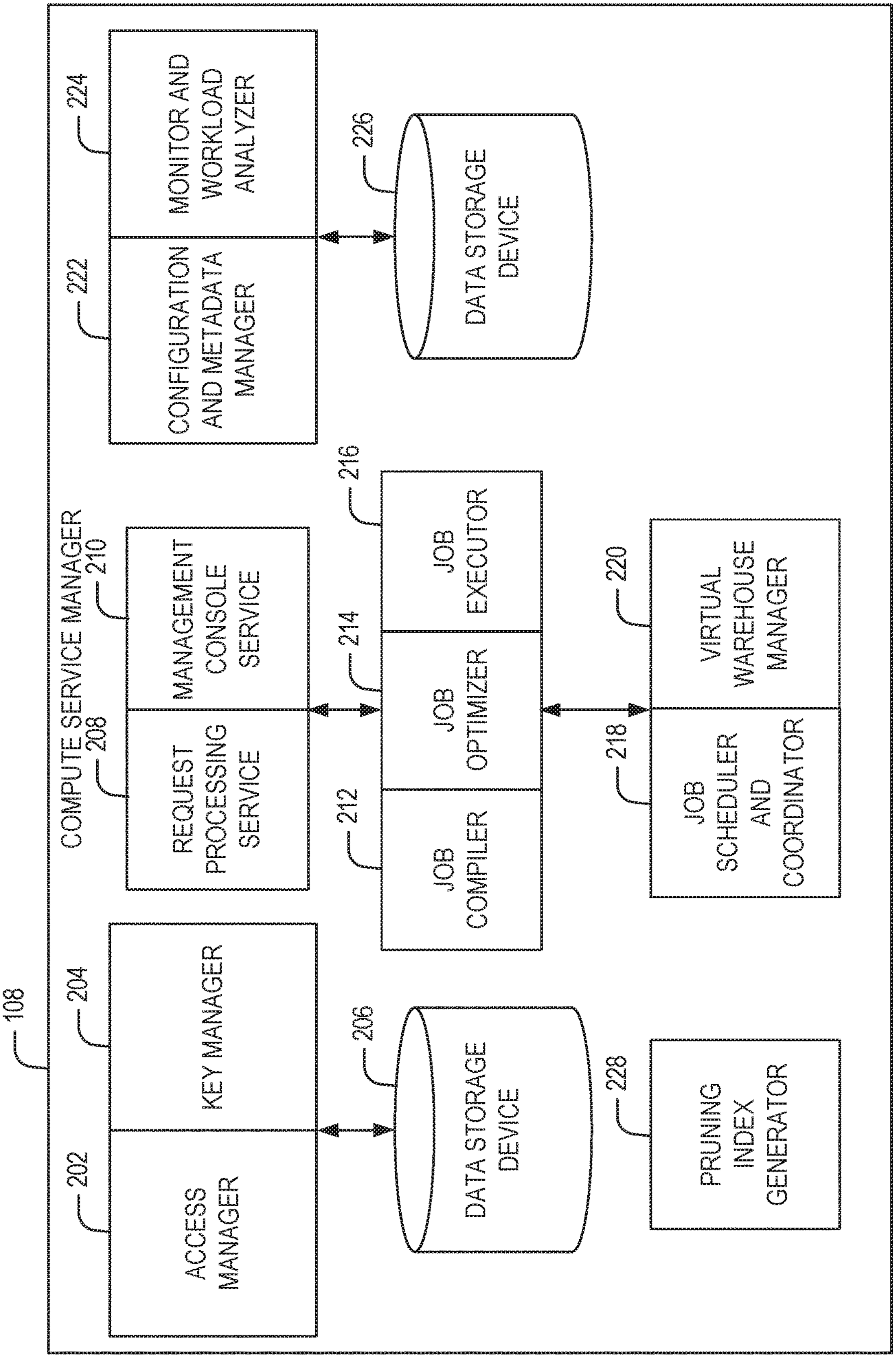
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistribute tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent caches in execution platform 110, storage devices in storage platform 104, or any other storage device.

As shown, the compute service manager 108 further includes a pruning index generator 228. The pruning index generator 228 is responsible for generating pruning indexes to be used in pruning scan sets for queries directed to tables stored in the storage platform 104. Each pruning index comprises a set of filters (e.g., blocked bloom filters, bloom filters, hash filter, or cuckoo filters) that encode an existence of unique values in each column of a source table. The pruning index generator 228 generates a filter for each micro-partition of a source table and each filter indicates whether data matching a query is potentially stored on a particular micro-partition of the source table. Further details regarding the generation of pruning indexes are discussed below.

Figure 3:
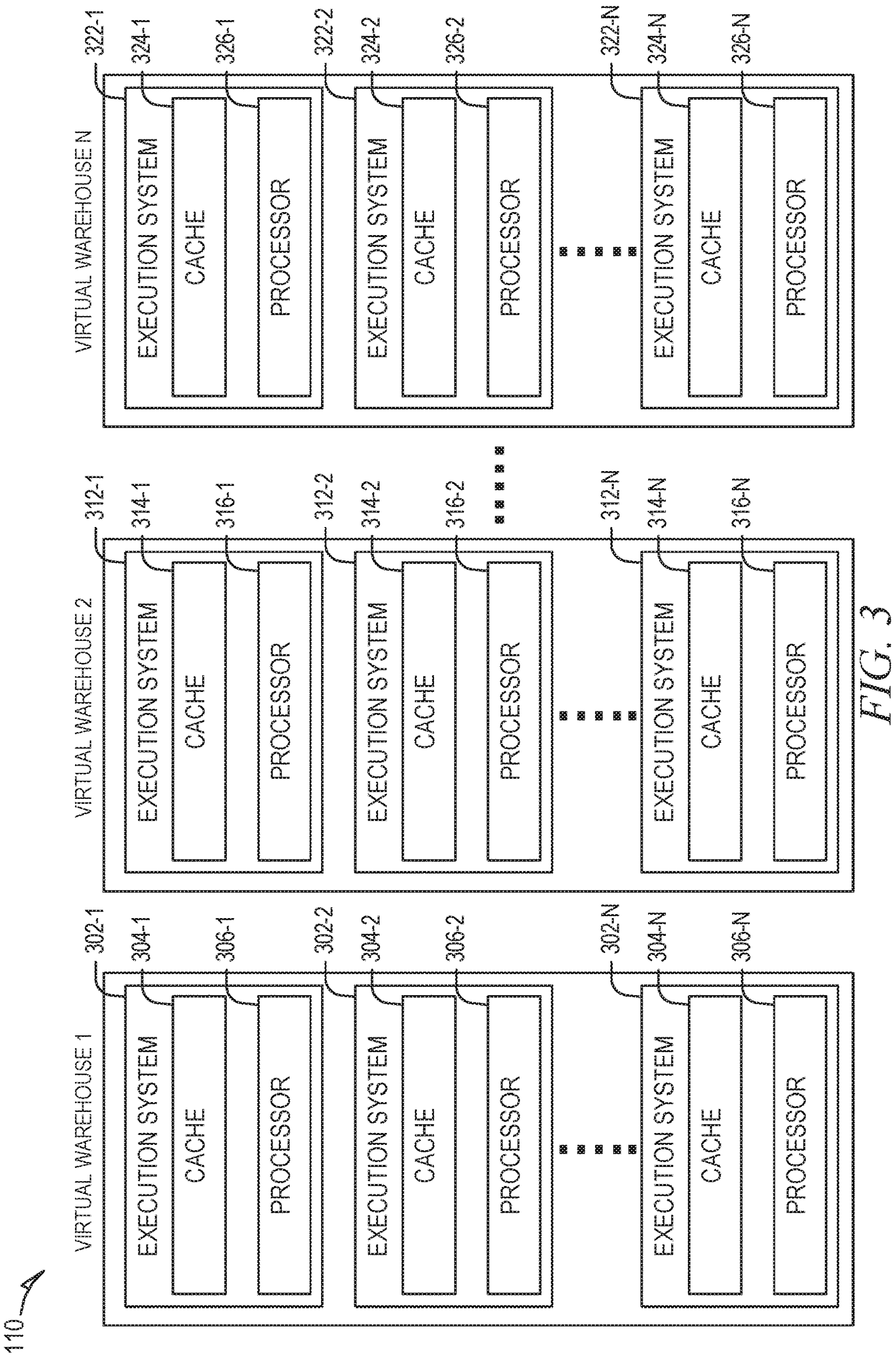
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-*n* and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-*n*. Execution node 302-1 includes a cache 304-1 and a processor 306-1. Execution node 302-2 includes a cache 304-2 and a processor 306-2. Execution node 302-*n* includes a cache 304-*n* and a processor 306-*n*. Each execution node 302-1, 302-2, and 302-*n* is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and **312-*n*. Execution node 312-1 includes a cache 314-1 and a processor 316-1. Execution node 312-2 includes a cache 314-2 and a processor 316-2. Execution node 312-*n* includes a cache 314-*n* and a processor 316-*n*. Additionally, virtual warehouse 3 includes three execution nodes 322-1, 322-2, and 322-*n*. Execution node 322-1 includes a cache 324-1 and a processor 326-1. Execution node 322-2 includes a cache 324-2 and a processor 326-2. Execution node 322-*n* includes a cache 324-*n* and a processor 326-*n***.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node **302-*n*** at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
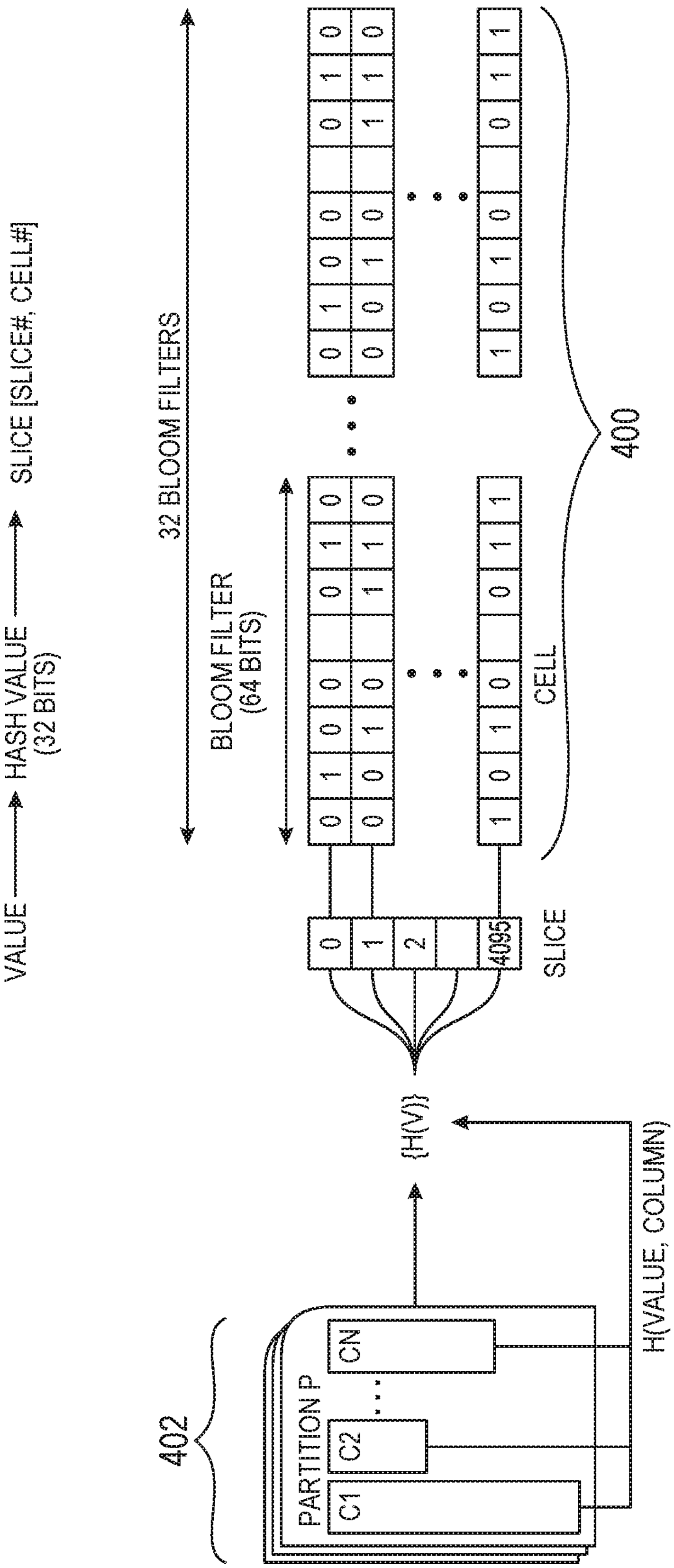
FIG. 4 is a conceptual diagram illustrating generation of a blocked bloom filter, which may form part of a pruning index generated by the network-based data warehouse system based on a source table, in accordance with some example embodiments.

FIG. 4 is a conceptual diagram illustrating generation of a filter 400, which forms part of a pruning index generated by the network-based data warehouse system 102 based on a source table 402, in accordance with some example embodiments. As shown, the source table 402 is organized into multiple micro-partitions and each micro-partition comprises multiple columns in which values are stored.

In generating a pruning index, the compute service manager 108 generates a filter for each micro-partition of the source table 402, an example of which is illustrated in FIG. 4 as blocked bloom filter 400. Blocked bloom filter 400 comprises multiple bloom filters and encodes the existence of distinct values in each column of the corresponding micro-partition. When a query comprising an equality predicate is received, rather than scanning the entire source table 402 to evaluate the equality predicate, the network-based data warehouse system 102 probes the pruning index to identify a reduced scan set of micro-partitions comprising only a sub-set of the micro-partitions of the source table 402.

As shown, the blocked bloom filter 400 is decomposed into N bloom filters stored as individual columns of the pruning index to leverage columnar scans. In generating the blocked bloom filter 400 for a particular micro-partition of the source table 402, stored values are transformed into bit positions in the bloom filters. For example, a set of hash values may be generated from stored values in each column of the micro-partition and the set of hash values may be used to set bits in the bloom filters.

The number of distinct values over all the columns in a micro-partition is bounded by a maximum size of the micro-partition. As an example, in the worst case, for a 16 MB partition, the sum of the number of distinct values for all columns is at most 4 million (16 MB/4 bytes). Accordingly, to make access of the pruning index as efficient as possible, each bloom filter 400 is sliced into a fixed number of chunks on the domain of the hash values (e.g., based on the number of distinct values per partition), and each bloom filter 400 is further decomposed in a fixed number of M-bit (e.g., 64 bit) values. Each line of the blocked bloom filter 400 is encoded and stored as a single row in the pruning index. Each bloom filter 400 is represented in the pruning index as a two-dimensional array indexed by the hash values of the stored column values.

FIG. 5 illustrates a portion of an example pruning index 500, in accordance with some embodiments of the present disclosure. The pruning index 500 is organized into a plurality of rows and columns. The columns of the pruning index 500 comprise a partition number 502, a slice number 504 that provides an encoding of the domain of hash values, a summary type 506, a hash number 508, and a blocked bloom filter 510 (e.g., the blocked bloom filter 400) that is decomposed into N numeric columns, each column in the blocked bloom filter 510 represents a bloom filter.

Within each row, a micro-partition number or other identifier is included in the partition number 502, a slice number is included in the slice number 504 column, an indicator of a summary type is stored in the summary type 506 column, and a number corresponding to the number of hash functions used to build the bloom filters is stored in the hash number 508 column. Each slice number 504 in the slice number column comprises a combination of level and block number. The level indicates the number of slices of the bloom filter 510 and the block number indicates the position of the slice in a specific bloom filter 510 (e.g., in the bloom filter column). The number of hash functions may be tuned to control the false positive rate of the pruning index 500.

The cost in terms of computational resources of accessing a pruning index is mostly bounded by the size of the index, and thus it is beneficial to minimize the total size of the pruning index. To this end, the compute service manager 108 can reduce the number of slices computed per micro-partition. The first level of partitioning of the pruning index is performed to represent the domain of hash values. At one extreme, a bloom filter can cover the complete domain of hash values (where the bloom filter comprises a single slice) and at the other extreme a bloom filter can be split in an arbitrary maximum of slices (4096 for example). This decision is parameterized by the number of distinct values in the source table because a single slice of the pruning index can only represent a limited number of distinct values.

The number of distinct values significantly impacts the cost of clustering because it controls the number of rows generated for a given micro-partition. For example, a micro-partition with a small number of distinct values (e.g., 3) would have a single slice, while a micro-partition with a large number of distinct values (e.g., 1 million) may have the maximum number of slices. In general, the maximum number of distinct values determines the maximum number of slices to encode. Accordingly, in some embodiments, the compute service manager 108 uses a first portion of the hash value (e.g., the 16 higher bits) for the level and a second portion of the hash value (e.g., the 16 lower bits) for addressing.

Figure 6:
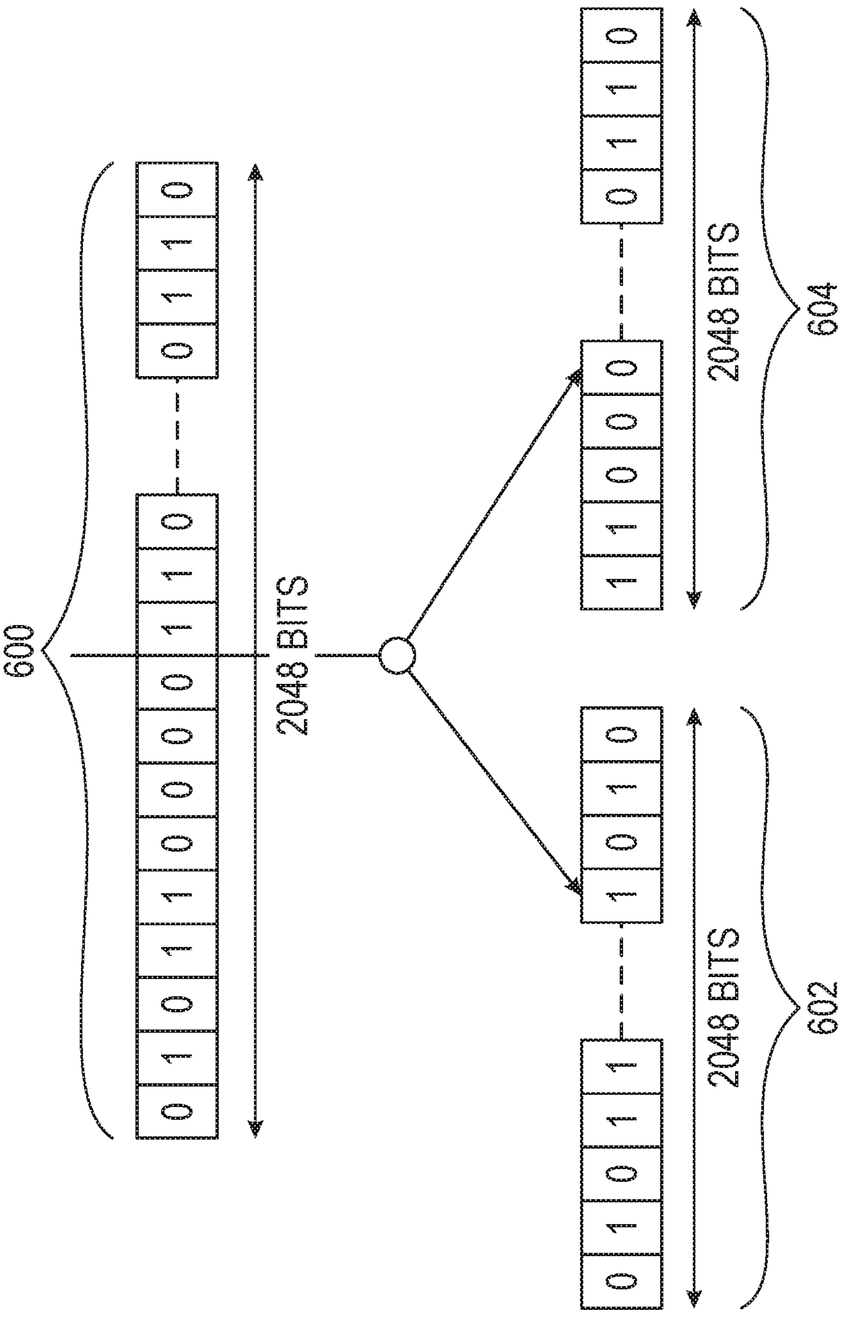
FIG. 6 illustrates a single bloom filter of a pruning index, in accordance with some embodiments of the present disclosure.

To this end, blocks within the pruning index 500 are organized in a hierarchy that encodes the level of decomposition of the domain of values. As an example of the foregoing, FIG. 6 illustrates a single bloom filter 600 of a pruning index. In the example illustrated in FIG. 6, bloom filter 600 is 2048 bytes and can represent 64 distinct values with a false positive rate of 1/1,000,0000. If the corresponding micro-partition of the source table contains more than 64 distinct values, the false positive rate would degrade as soon as the density of the bloom filter is larger than ½ (e.g., more bits are set than bits are unset). To address this issue, the compute service manager 108 can, in some embodiments, build two bloom filters (bloom filters 602 and 604), with one bloom filter for each half of the domain.

Each of the bloom filters 602 and 604 will be represented by two rows in the pruning index, identified by their level and slice number. Consistent with some embodiments, a particular value and its corresponding hash value maps to a single one of the blocks across all micro-partitions of the source table. Regardless of the level, a bit encodes a fixed subset of the domain.

Each slice number comprises a combination of a level number and a block number. The level and block number may, in some embodiments, be represented as two distinct columns, while in other embodiments, a linearization processes is used in clustering to combine these values together to form the slice number.

In some embodiments, the number of hash functions to compute per bloom filter can be varied to improve performance. This optimization can reduce the CPU cost of building the pruning index while maintaining a target false positive rate for extremely large tables. Accordingly, in some embodiments, a user may specify a target false positive rate and the compute service manager 108 may determine the number of hash functions to compute per bloom filter as well as the level based on the target false positive rate.

Figure 7:
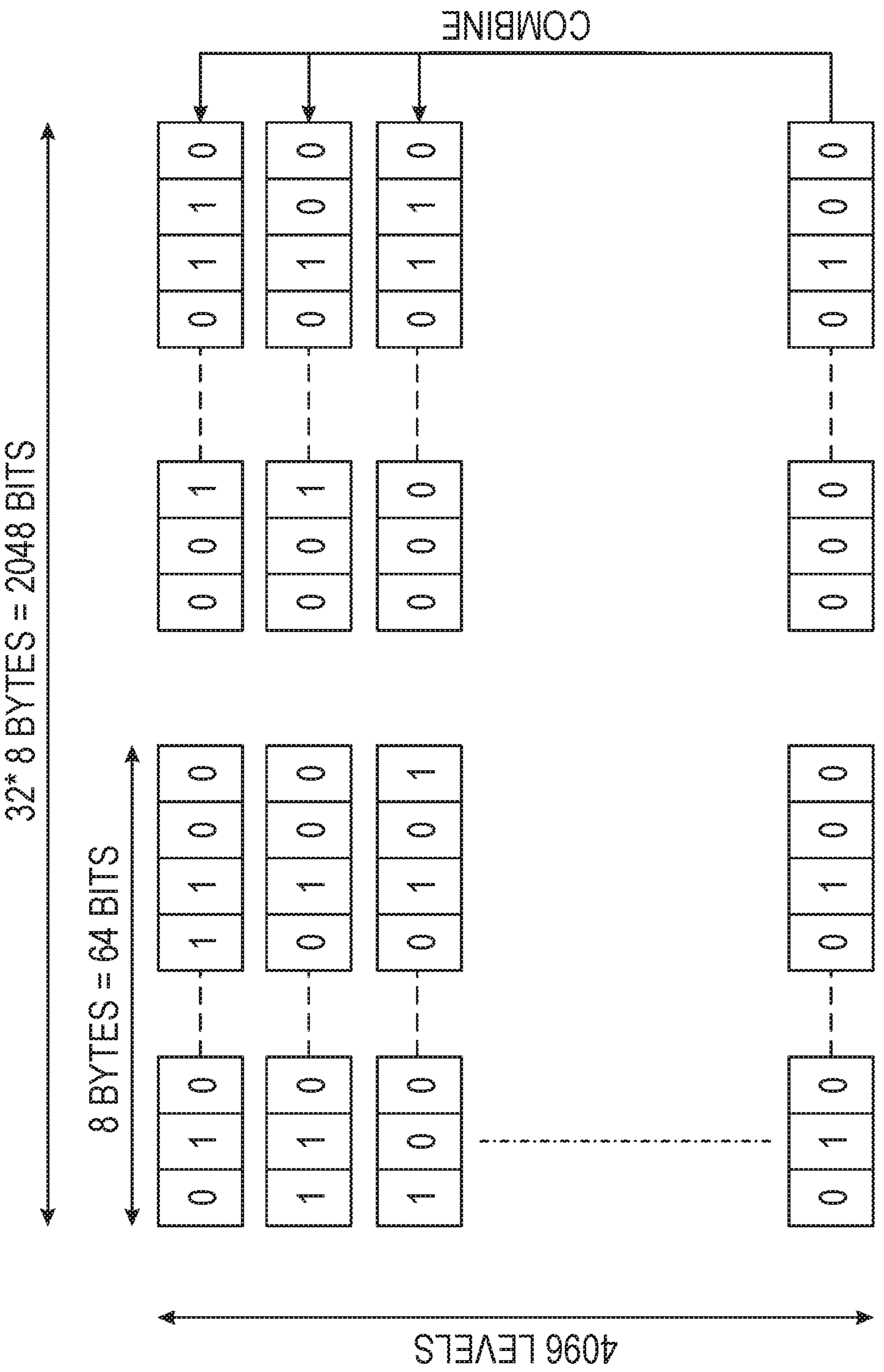
FIG. 7 is a conceptual diagram illustrating further details regarding the creation of a pruning index, in accordance with some embodiments.

FIG. 7 is a conceptual diagram illustrating further details regarding the creation of a pruning index, in accordance with some embodiments. The creation of a filter (e.g., a blocked bloom filter) is performed by a specialized operator within the compute service manager 108 that computes the set of rows of the pruning index. This operator obtains all the columns of a particular micro-partition of a source table and populates the filter for that micro-partition.

If the total number of distinct values in the source table is unknown, the compute service manager 108 allocates the maximum number of levels to the pruning index, populates each filter and then applies a consolidation phase to merge the different filters in a final representation of the pruning index. The memory allocated to compute this information per micro-partition is constant. In the example illustrated in FIG. 7, the memory allocated to compute this information is a two-dimensional array of 64-bit unsigned integers. The first dimension is indexed by the level (maximum number of levels) and the second dimension is indexed by the number of bloom filters (e.g., 32). Since each partition is processed by a single thread, the total memory is bounded by the number of threads (e.g., 8) and the maximum level of levels.

The following snippet of pseudocode represents an example algorithm that may be performed by the compute service manager 108 in generating a pruning index, consistent with some embodiments.

```
If it is a new partition:
    Merge all the filters
For each column, do:
    Compute a 32-bits hash value H for each value of the
      column
    Compute the level L by using the 16 high bits,
      L=H>>16
    Compute the filter at position P=H & (32-1)
    If the bloom filter does not contain the value,
      increment the number of distinct values
```

As shown in FIG. 7, at each partition boundary, the compute service manager 108 combines blocks based on a target bloom filter density. For example, the compute service manager 108 may combine blocks such that the bloom filter density is no more than half. Since the domain of hashed values is uniform, this can be done incrementally or globally based on the observed number of distinct values computed above.

If the number of distinct values is known, the compute service manager 108 determines the number of levels for the pruning index by dividing the maximum number of distinct values by the number of distinct values per level. To combine two levels, the compute service manager 108 performs a logical OR on all the integers representing the filter.

For performance reasons, the filter functions (create and check) combine two hash functions (e.g., two 32-bit hash functions). Both the hash function computation and the filter derivation needs to be identical on both the execution platform 110 and compute service manager 108 to allow for pruning in compute service manager 108 and in the scan set initialization in the execution platform 110.

Figure 8:
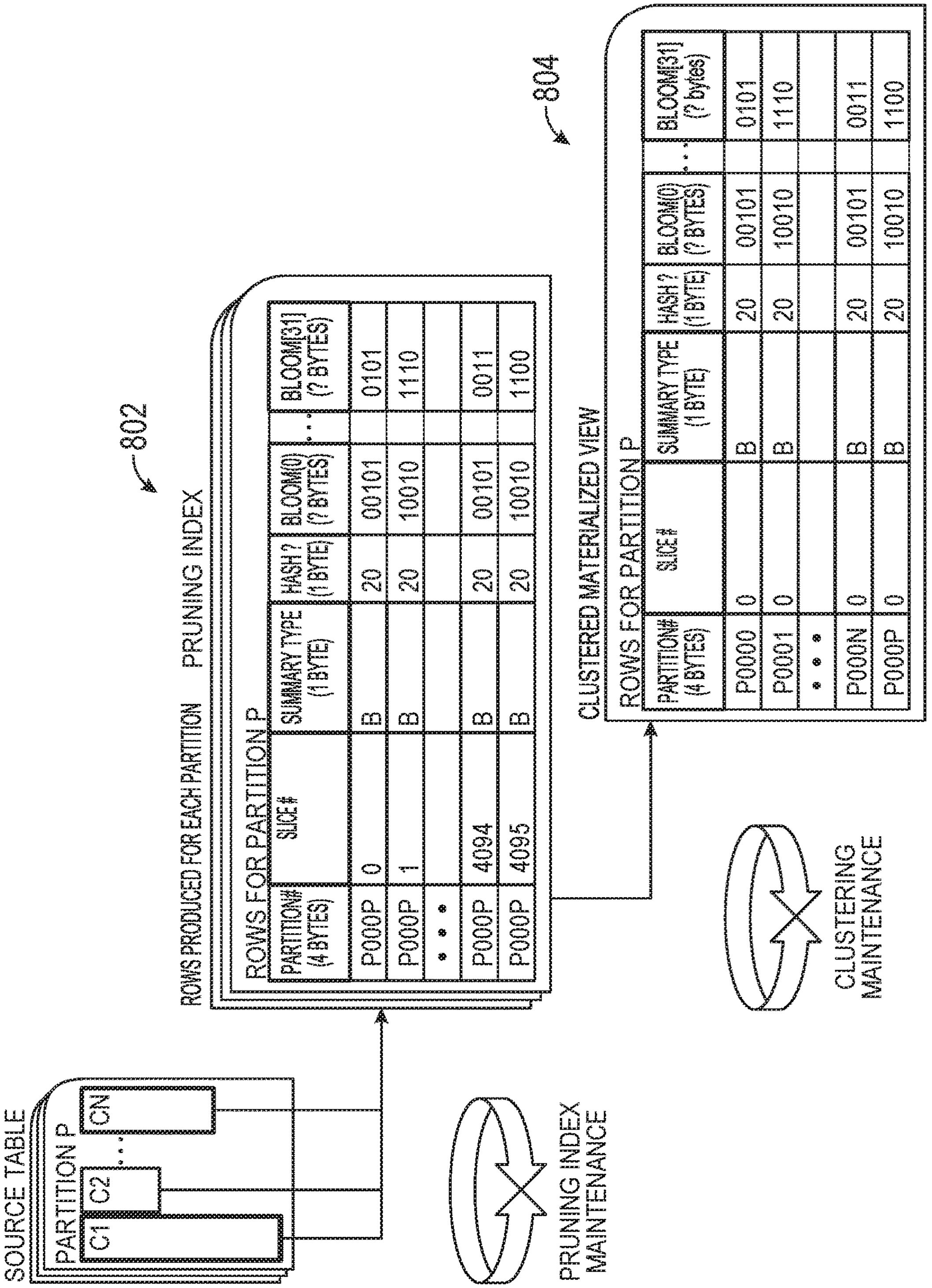
FIG. 8 is a conceptual diagram illustrating maintenance of a pruning index, in accordance with some embodiments.
Figure 9:
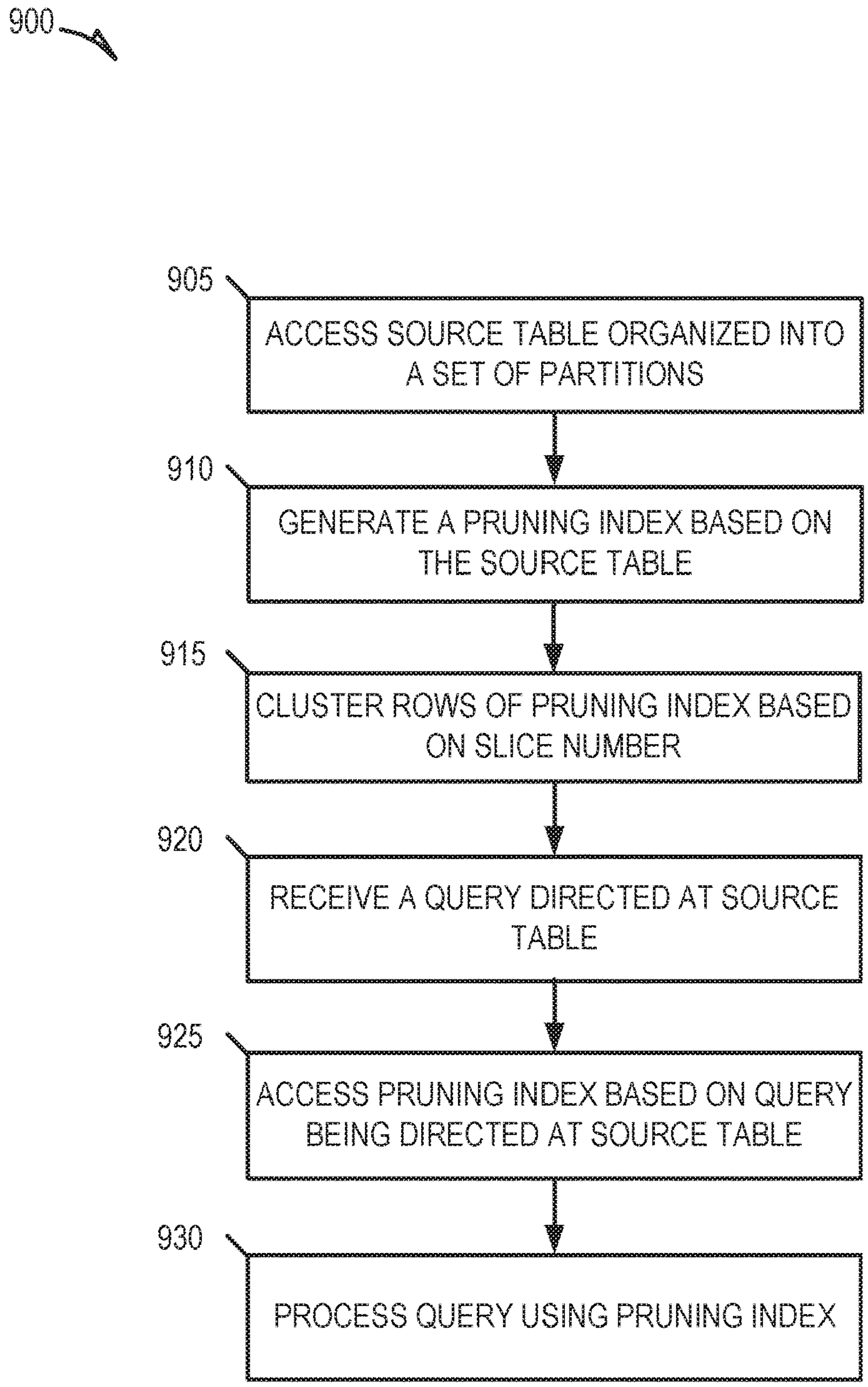
FIGS. 9-13 are flow diagrams illustrating operations of the network-based data warehouse system in performing a method for generating and using a pruning index in processing a database query, in accordance with some embodiments of the present disclosure.

FIG. 8 is a conceptual diagram illustrating maintenance of a pruning index based on changes to a source table, in accordance with some embodiments. As shown, at 800, a change is made to a source table (e.g., addition of one or more rows or columns). The change to the source table triggers generation of additional rows in the pruning index for each changed or new micro-partition of the source table, at 802. At a regular interval, the newly produced rows in the pruning index are reclustered on the slice number, at 804.

The compute service manager 108 uses a deterministic selection algorithm as part of clustering the prune index. The processing of each micro-partition in the source table creates a bounded (and mostly constant) number of rows based on the number of distinct values in the source micro-partition. By construction, those rows are known to be unique and the index domain is non-overlapping for that partition and fully overlapping with already clustered index rows. To minimize the cost of clustering, the compute service manager 108 delays reclustering of rows until a threshold number of rows have been produced to create constant partitions.

Although the pruning index is described in some embodiments as being implemented specifically with blocked bloom filters, it shall be appreciated that the pruning index is not limited to blocked bloom filters, and in other embodiments, the pruning index may be implemented using other filters such as bloom filters, hash filters, or cuckoo filters.

FIGS. 9-13 are flow diagrams illustrating operations of the network-based data warehouse system 102 in performing a method 900 for generating and using a pruning index in processing a database query, in accordance with some embodiments of the present disclosure. The method 900 may be embodied in computer-readable instructions for execution by one or more hardware components (e.g., one or more processors) such that the operations of the method 900 may be performed by components of network-based data warehouse system 102. Accordingly, the method 900 is described below, by way of example with reference thereto. However, it shall be appreciated that the method 900 may be deployed on various other hardware configurations and is not intended to be limited to deployment within the network-based data warehouse system 102.

Depending on the embodiment, an operation of the method 900 may be repeated in different ways or involve intervening operations not shown. Though the operations of the method 900 may be depicted and described in a certain order, the order in which the operations are performed may vary among embodiments, including performing certain operations in parallel or performing sets of operations in separate processes. For example, although the use and generation of the pruning index are described and illustrated together as part of the method 900, it shall be appreciated that the use and generation of the pruning index may be performed as separate processes, consistent with some embodiments.

At operation 905, the compute service manager 108 accesses a source table that is organized into a plurality of micro-partitions. The source table comprises a plurality of cells organized into rows and columns and a data value is included in each cell.

At operation 910, the compute service manager 108 generates a pruning index based on the source table. The pruning index comprises a set of filters (e.g., a set of blocked bloom filters) that index distinct values in each column of each micro-partition of the source table. A filter is generated for each micro-partition in the source table and each filter is decomposed into N numeric columns (e.g., 32 numeric columns) to enable integer comparisons. Consistent with some embodiments, the pruning index comprises a plurality of rows and each row comprises a micro-partition identifier, a slice number, and a set of bloom filters.

At operation 915, the compute service manager 108 clusters rows of the pruning index based on slice numbers. In clustering rows based on slice numbers, the compute service manager 108 groups together rows that have the same slice number and sorts the row groups in order based on corresponding slice number.

At operation 920, the compute service manager 108 receives a query directed at the source table. The query can comprise an equality predicate.

At operation 925, the compute service manager 108 accesses the pruning index associated with the source table based on the query being directed at the source table. For example, the database 114 may store information describing associations between tables and pruning indexes.

At operation 930, the compute service manager 108 works in conjunction with the execution platform 110 to process the query using the pruning index. In processing the query, the compute service manager 108 and/or the execution platform 110 may use the pruning index to prune the set of micro-partitions of the search table to be scanned for data that matches the query (e.g., a data value that satisfies the equality predicate). That is, the pruning index may be used to identify a reduced scan set comprising only a sub-set of the micro-partitions of the source table. The compute service manager 108 uses the pruning index to identify one or more micro-partitions in which data that satisfies the equality predicate is potentially stored. In processing the query, the execution platform 110 scans the sub-set of micro-partitions of the reduced scan set while foregoing a scan of the remaining micro-partitions.

Figure 10:
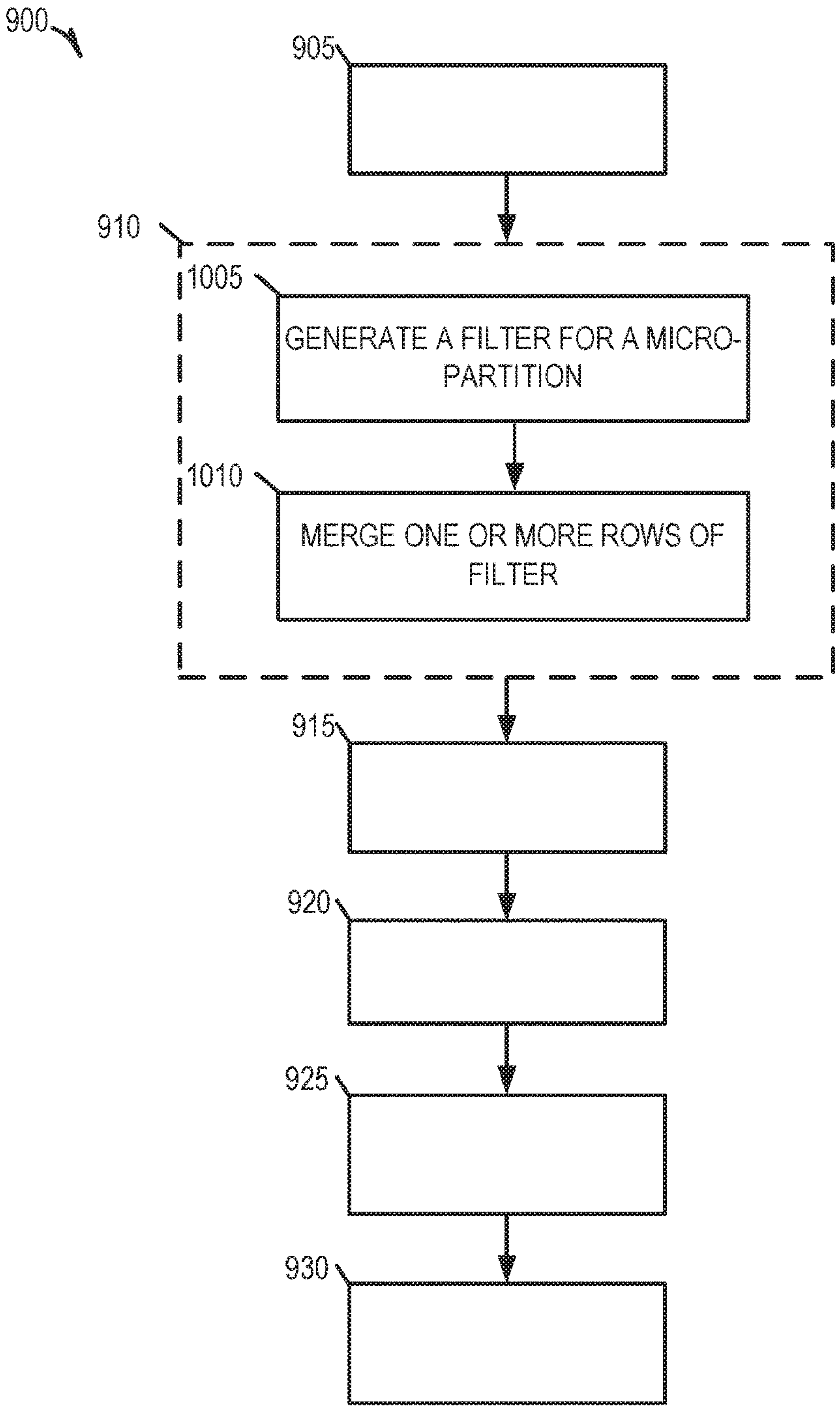

As shown in FIG. 10, the method 900 may, in some embodiments, further include operations 1005 and 1010. Consistent with these embodiments, the operations 1005 and 1010 may be performed as part of the operation 910 where the compute service manager 108 generates the pruning index. The operations 1005 and 1010 are described below in reference to a single micro-partition of the source table simply for ease of explanation. However, it shall be appreciated, that in generating the pruning index, the compute service manager 108 generates a filter for each micro-partitions of the source table and thus, the operations 1005 and 1010 may be performed for each micro-partition of the source table.

At operation 1005, the compute service manager 108 generates a filter for a micro-partition of the source table. For example, the compute service manager 108 may generate a blocked bloom filter for the micro-partition that indexes distinct values in each column of the micro-partition of the source table. Further details regarding the generation of the filter for the micro-partition are discussed below in reference to FIG. 11.

At operation 1010, which is optional in some embodiments, the compute service manager 108 merges one or more rows of the filter. The compute service manager 122 can merge rows by performing a logical OR operation. The compute service manager 108 may merge rows of the filter until a density threshold is reached, where the density refers to the ratio of l's and 0's in a row. The density threshold may be based on a target false positive rate.

Figure 11:
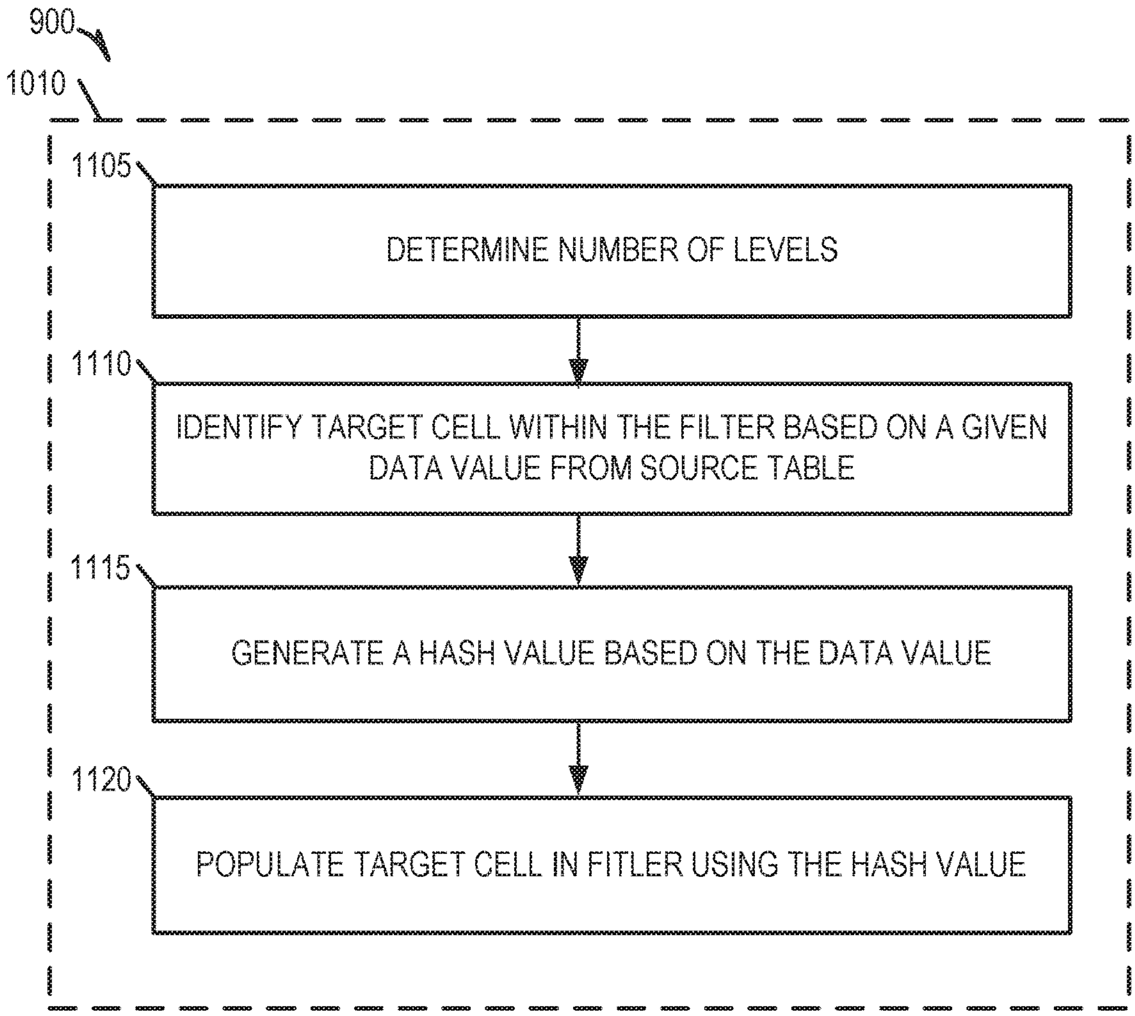

As shown in FIG. 11, the operation 1005, may, in some embodiments, include operations 1105, 1110, 1115, and 1120. At operation 1105, the compute service manager 108 computes a number of levels for the filter corresponding to the micro-partition of the source table. If the number of distinct values in the micro-partition of the source table is unknown, the compute service manager 108 determines the number of levels based on a maximum number of possible distinct values. If the number of distinct values in the micro-partition of the source table is known, the compute service manager 108 determines the number of levels based on the number of distinct values.

At operation 1110, the compute service manager 108 identifies a target cell within the filter based on a given data value included in a column of a micro-partition of the source table. To identify the target cell, the compute service manager 108 identifies a slice and a filter column in the filter. The compute service manager 108 identifies the slice based on the data value and the number of levels in the pruning index. The compute service manager 108 identifies the filter column based on the data value and a number of filter columns in the blocked bloom filter.

At operation 1115, the compute service manager 108 generates a hash value based on the data value from the source table. In generating the hash value, the compute service manager 108 may apply one or more hash functions to the data value. At operation 11120, the compute service manager 108 populates the target cell in the blocked bloom filter using the hash value.

For ease of explanation, operation 1110, 1115, and 1120 are described above in reference to a single data value in a single micro-partition of the source table. However, it shall be understood that in generating a filter for a micro-partition of the source table, the operation 1110, 1115, and 1120 are repeated for each data value of each column of the micro-partition in the source table.

Figure 12:
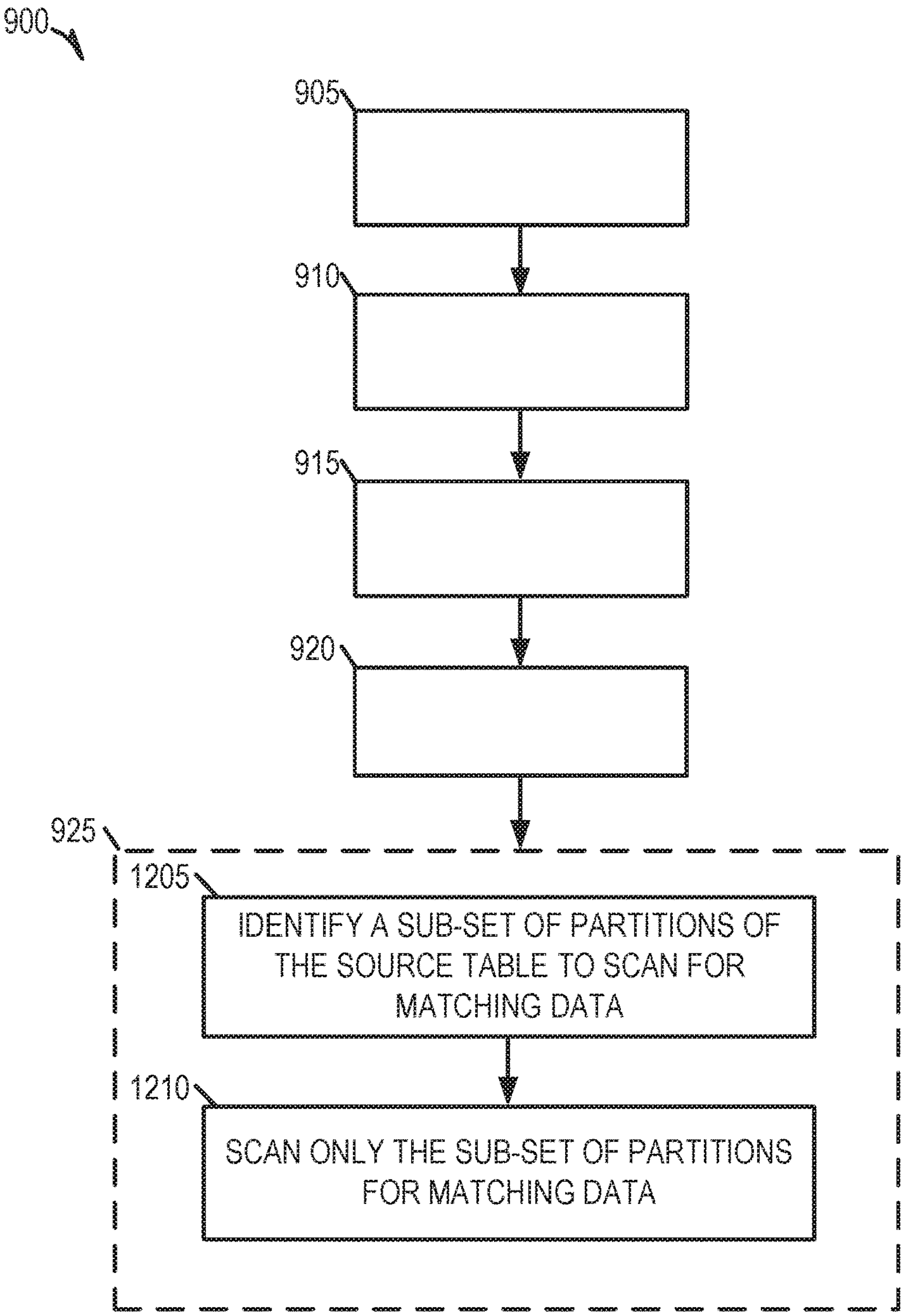

As shown in FIG. 12, the method 900 may, in some embodiments, include operations 1205 and 1210. Consistent with these embodiments, the operations 1205 and 1210 may be performed as part of operation 925 where the compute service manager 108 works in conjunction with the execution platform 110 to process the query using the pruning index.

At operation 1205, the compute service manager 108 identifies a reduced scan set comprising a sub-set of micro-partitions of the source table to scan for data that satisfies the equality predicate in the query. The sub-set of micro-partitions of the source table include micro-partitions determined to potentially include the matching data based on the set of blocked bloom filters in the pruning index. The compute service manager 108 may identify the sub-set of micro-partitions by generating a hash value based on the equality predicate and identifying one or more values in the pruning index that match the hash value. The compute service manager 108 identifies one or more micro-partitions that potentially store data that satisfies the equality predicate based on the one or more values in the pruning index that match the hash value. That is, a value in the pruning index matching the hash value indicates that matching data is potentially stored in a micro-partition that can be identified based on the slice number and filter column corresponding to the cell of the pruning index in which the value is stored.

The compute service manager 108 communicates the sub-set of micro-partitions to the execution platform 110, and the execution platform 110 scans only the sub-set of micro-partitions of the source table in the reduced scan set to locate data that satisfies the equality predicate. In this way, the execution platform 110 searches only micro-partitions where matching data is potentially stored while foregoing an expenditure of additional time and resources to also search the remaining micro-partitions for which it is known, based on the pruning index, that matching data is not stored.

Consistent with some embodiments, rather than providing a reduced scan set with micro-partitions of the source table to scan for data, the compute service manager 108 may instead identify and compile a set of non-matching micro-partitions. The compute service manager 108 or the execution platform 110 may remove micro-partitions from the scan set based on the set of non-matching micro-partitions.

Figure 13:
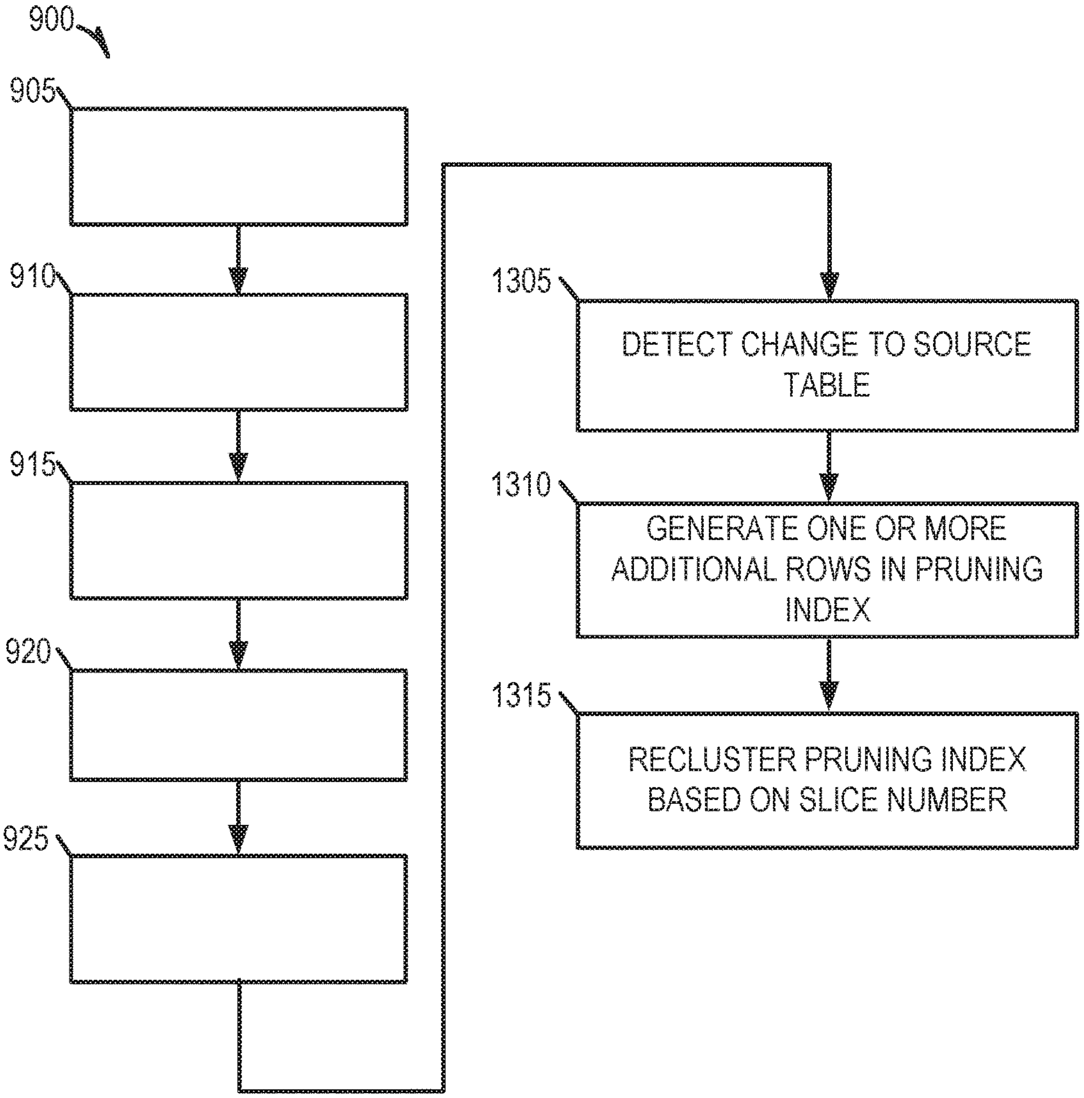

As shown in FIG. 13, the method 900 may, in some embodiments, include operations 1305, 1310, and 1315. Although the operations 1305, 1310, and 1315 are illustrated as being performed subsequent to operation 925, it shall be appreciated that the operations 1305, 1310, and 1315 may be performed at any time subsequent to the operation 910 where compute service manager 108 generates the pruning index.

At operation 1305, the compute service manager 108 detects a change to the source table. The change to the source table may include one or more rows being added to and/or deleted from the source table.

At operation 1310, the compute service manager 108 generates one or more additional rows in the pruning index associated with the source table based on the change to the source table. The compute service manager 108 generates additional rows in the same manner in which rows of the pruning index are generated during the initial creation of the pruning index.

At operation 1315, the compute service manager 108 reclusters the pruning index based on slice number. Consistent with some embodiments, the compute service manager 108 may wait to recluster the pruning index until a threshold number of additional rows have been added to the pruning index.

Figure 14:
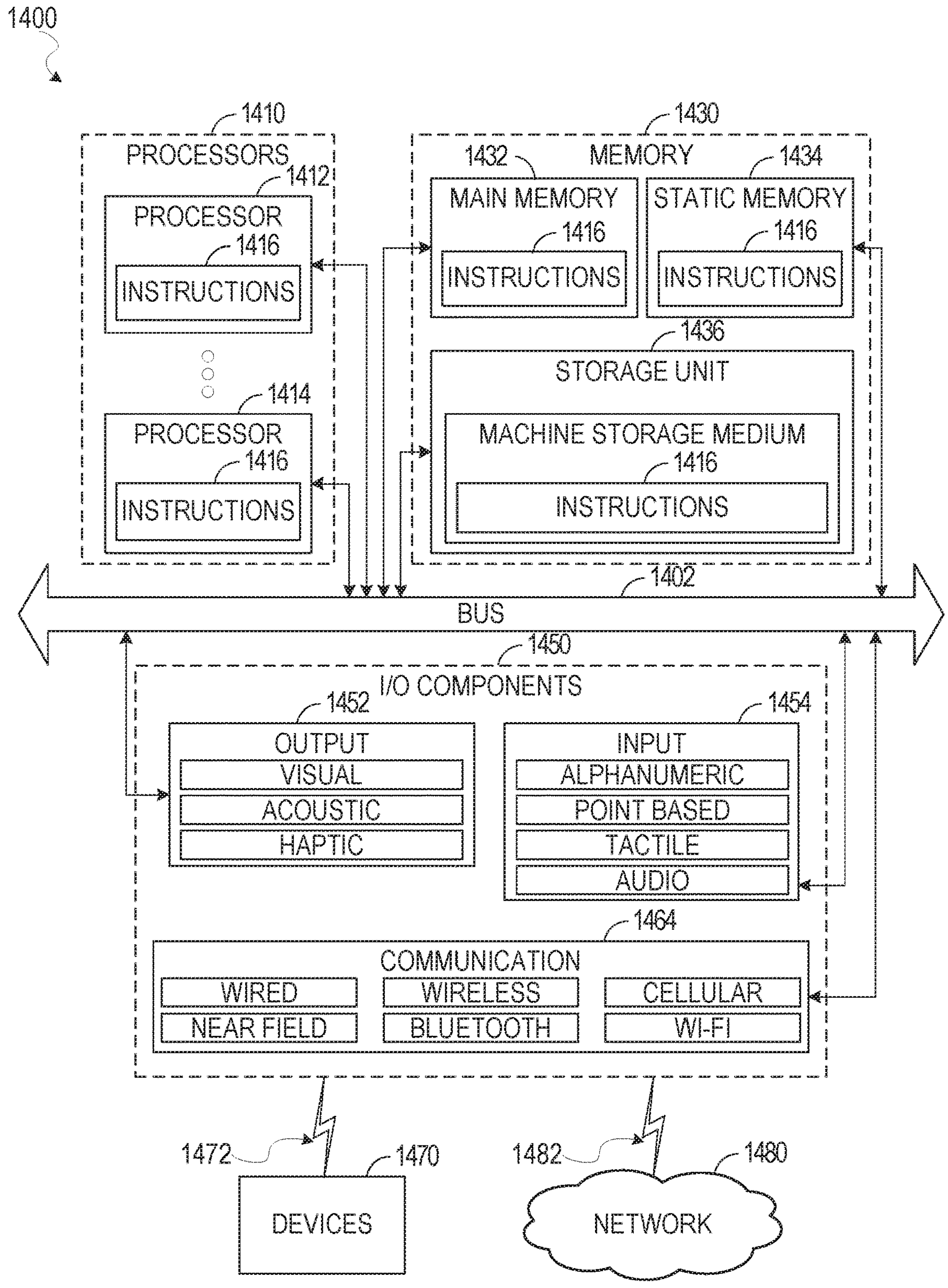
FIG. 14 illustrates a diagrammatic representation of a machine in the form of a computer system within which a set of instructions may be executed for causing the machine to perform any one or more of the methodologies discussed herein, in accordance with some embodiments of the present disclosure.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, the instructions 1416 may cause the machine 1400 to execute any one or more operations of any one or more of the method 900. As another example, the instructions 1416 may cause the machine 1400 to implement portions of the functionality illustrated in any one or more of FIGS. 4-8. In this way, the instructions 1416 transform a general, non-programmed machine into a particular machine 1400 (e.g., the compute service manager 108, the execution platform 110, and the data storage devices 206) that is specially configured to carry out any one of the described and illustrated functions in the manner described herein.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 includes processors 1410, memory 1430, and input/output (I/O) components 1450 configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors 1410 that may comprise two or more independent processors (sometimes referred to as "cores") that may execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436, all accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within the storage unit 1436, within at least one of the processors 1410 (e.g., within the processor's cache memory), or any suitable combination thereof, during execution thereof by the machine 1400.

The I/O components 1450 include components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, and other communication components to provide communication via other modalities. The devices 1470 may be another machine or any of a wide variety of peripheral devices (e.g., a peripheral device coupled via a universal serial bus (USB)). For example, as noted above, the machine 1400 may correspond to any one of the compute service manager 108, the execution platform 110, and the devices 1470 may include the data storage device 206 or any other computing device described herein as being in communication with the network-based data warehouse system 102 or the storage platform 104.

Executable Instructions and Machine Storage Medium

The various memories (e.g., 1430, 1432, 1434, and/or memory of the processor(s) 1410 and/or the storage unit 1436) may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 900 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

EXAMPLES

Example 1 is a network-based data warehouse system comprising: at least one hardware processor; and a memory storing instructions that cause the at least one hardware processor to perform operations comprising: accessing a source table organized into a set of micro-partitions; generating a pruning index based on the source table, the pruning index comprising a set of filters that index distinct values in each column of the source table; receiving a query directed to the source table; and processing the query using the pruning index, the processing of the query comprising pruning the set of micro-partitions of the source table to scan for data matching the query, the pruning of the set of micro-partitions comprising identifying, using the pruning index, a sub-set of micro-partitions to scan for the data matching the query.

In Example 2 the subject matter of Example 1 optionally further comprises: generating a filter for each micro-partition of the source table.

In Example 3, the subject matter of any one of Examples 1 and 2 optionally further comprises generating a first filter for a first micro-partition by performing operations comprising: for a given data value, identifying a cell within the first filter based on the data value; generating a hash value based on the data value; and populating the cell in the first filter using the hash value.

In Example 4, the subject matter of any one of Examples 1-3 optionally further comprises: computing a number of levels in the first filter; and identifying a slice in the first filter based on the data value and the number of levels in the first filter; and identifying a filter column based on the data value and a predetermined number of filter columns in the first bloom blocked filter.

In Example 5, the subject matter of any one of Examples 1-4 optionally further comprises: merging one or more rows of the first filter based on a target false positive rate.

Example 6 comprises the subject matter of any one of Examples 1-5, a filter in the set of filters optionally comprises a set of bloom filters; and the pruning index optionally comprises a plurality of columns, the plurality of columns comprising a micro-partition identifier column, a slice number column, and the set of bloom filters.

In Example 7, the subject matter of any one of Examples 1-6, optionally further comprises: clustering a plurality of rows on a slice number column.

In Example 8, the filter of any one of Examples 1-7 optionally further comprises multiple bloom filters, a number of bloom filters in the filter being based on a false positive rate constraint.

In Example 9, the subject matter of any one of Examples 1-8 optionally further comprise: generating a hash value based on an equality predicate included in the query; identifying one or more values in the pruning index that match the hash value; and identifying one or more micro-partitions that potentially satisfy the equality predicate based on the one or more values in the pruning index that match the hash value.

In Example 10, the subject matter of any one of Examples 1-9 optionally further comprises: detecting a change to the source table; generating one or more additional rows for the pruning index based on the change to the source table; and recluster pruning index based on slice number.

In Example 11, the subject matter of any one of Examples 1-10 optionally further comprises scanning the sub-set of micro-partitions of the source table to identify data matching the query.

In Example 12, the subject matter of any one of Examples 1-11 optionally further comprises identifying one or more micro-partitions in which data matching the query is potentially stored.

Example 13 is a method comprising: accessing a source table organized into a set of micro-partitions; generating, by one or more hardware processors of a computer, a pruning index based on the source table, the pruning index comprising a set of filters that index distinct values in each column of the source table; receiving a query directed to the source table; and processing the query using the pruning index, the processing of the query comprising pruning the set of micro-partitions of the source table to scan for data matching the query, the pruning of the set of micro-partitions comprising identifying, using the pruning index, a sub-set of micro-partitions to scan for the data matching the query.

In Example 14, the subject matter of Example 13 optionally further comprises: generating a filter for each micro-partition of the source table.

In Example 15, the subject matter of any one of Examples 13-14 optionally further comprises: generating a first filter for a first micro-partition by performing operations comprising: for a given data value, identifying a cell within the first filter based on the data value; generating a hash value based on the data value; and populating the cell in the first filter using the hash value.

In Example 16, the subject matter of any one of Examples 13-15 optionally further comprises: computing a number of levels in the first filter; and identifying a slice in the first filter based on the data value and the number of levels in the first filter; and identifying a filter column based on the data value and a predetermined number of filter columns in the first bloom blocked filter.

In Example 17, the subject matter of any one of Examples 13-16, optionally further comprises: computing a number of levels in the pruning index; identifying a level in the first filter based on the data value and the number of levels in the pruning index; and identifying a filter column based on the data value and a predetermined number of filter columns in the first bloom blocked filter.

In Example 18, the subject matter of any one of Examples 13-17 optionally further comprises: merging one or more rows of the first filter based on a target false positive rate Example 19 comprises the subject matter of any one of Examples 13-18, wherein a filter in the set of filters optionally comprises a set of bloom filters; the pruning index further optionally comprises a plurality of columns, the plurality of columns comprising a micro-partition identifier column, a slice number column, and the set of bloom filters; and the pruning index is optionally clustered on the slice number columns.

In Example 20, the subject matter of any one of Examples 12-19 optionally further comprises: generating a hash value based on an equality predicate included in the query; identifying one or more values in the pruning index that match the hash value; and identifying one or more micro-partitions that potentially satisfy the equality predicate based on the one or more values in the pruning index that match the hash value.

In Example 21, the subject matter of any one of Examples 12-20 optionally further comprises: detecting a change to the source table; generating one or more additional rows for the pruning index based on the change to the source table; and reclustering the pruning index based on slice number.

In Example 22, the subject matter of any one of Examples 12-21 optionally further comprises scanning the sub-set of micro-partitions of the source table to identify data matching the query.

In Example 23, the subject matter of any one of Examples 12-22 optionally further comprises identifying one or more micro-partitions in which data matching the query is potentially stored.

Example 24 is computer-storage medium comprising instructions that, when executed by one or more processors of a machine, configure the machine to perform operations comprising: accessing a source table organized into a set of micro-partitions; generating a pruning index based on the source table, the pruning index comprising a set of filters that index distinct values in each column of the source table; receiving a query directed to the source table; and processing the query using the pruning index, the processing of the query comprising pruning the set of micro-partitions of the source table to scan for data matching the query, the pruning of the set of micro-partitions comprising identifying, using the pruning index, a sub-set of micro-partitions to scan for the data matching the query.

In Example 25, the subject matter of Example 24 optionally further comprises: generating a filter for each micro-partition of the source table.

In Example 26, the subject matter of any one of Examples 24-25 optionally further comprises: generating a first filter for a first micro-partition by performing operations comprising: for a given data value, identifying a cell within the first filter based on the data value; generating a hash value based on the data value; and populating the cell in the first filter using the hash value.

In Example 27, the subject matter of any one of Examples 24-26, optionally further comprises: computing a number of levels in the first filter; identifying a slice in the first filter based on the data value and the number of levels in the first filter; and identifying a filter column based on the data value and a number of filter columns in the first filter.

Example 28 comprises the subject matter of any one of Examples 24-27, wherein a filter in the set of filters optionally comprises a set of bloom filters; the pruning index further optionally comprises a plurality of columns, the plurality of columns comprising a micro-partition identifier column, a slice number column, and the set of bloom filters; and the pruning index is optionally clustered on the slice number columns.

In Example 29, the subject matter of any one of Examples 24-28 optionally further comprises: generating a hash value based on an equality predicate included in the query; identifying one or more values in the pruning index that match the hash value; and identifying one or more micro-partitions that potentially satisfy the equality predicate based on the one or more values in the pruning index that match the hash value.

In Example 30, the subject matter of any one of Examples 24-29 optionally further comprises: detecting a change to the source table; generating one or more additional rows for the pruning index based on the change to the source table; and reclustering the pruning index based on slice number.

The invention claimed is:

1. A system comprising:
- at least one hardware processor; and
- at least one memory storing instructions that cause the at least one hardware processor to perform operations comprising:
- organizing a source table into a set of partitions;
- receiving a query directed to the source table organized into the set of partitions;
- accessing, from a database, a pruning index associated with the source table, the pruning index comprising a set of filters that index distinct values in each column of the source table, each filter in the set of filters being represented as a two-dimensional array in the pruning index, each filter in the set of filters corresponding to one partition from the set of partitions; and
- processing the query using the pruning index, the processing of the query comprising:
  - identifying, using the pruning index, a sub-set of partitions to scan for data matching the query; and
  - scanning only the sub-set of partitions of the source table to identify data matching the query.

2. The system of claim 1, wherein the processing of the query using the pruning index comprises:
- generating a hash value based on an equality predicate included in the query;
- identifying one or more values in the pruning index that match the hash value; and
- identifying one or more partitions that potentially satisfy the equality predicate based on the one or more values in the pruning index that match the hash value.

3. The system of claim 1, wherein the identifying of the sub-set of partitions to scan for the data matching the query comprises identifying one or more partitions in which data matching the query is not stored.

4. The system of claim 1, wherein the identifying of the sub-set of partitions to scan for the data matching the query comprises identifying one or more partitions in which data matching the query is potentially stored.

5. The system of claim 1, wherein:
- each filter of the set of filters comprises multiple bloom filters, a number of bloom filters in each blocked bloom filter being based on a false positive rate constraint.

6. The system of claim 1, wherein the operations further comprise generating the pruning index, the generating of the pruning index comprising generating a first filter for a first partition of the set of partitions in the source table, the first filter indexing distinct values in each column of the first partition.

7. The system of claim 6, wherein the generating of the first filter comprises:

for a given data value, identifying a cell within the first filter based on the data value;

generating a hash value based on the data value; and populating the cell in the first filter using the hash value.

8. The system of claim 7, wherein the operations further comprise computing a number of levels in the first filter;

wherein the identifying of the cell comprises:

identifying a slice in the first filter based on the data value and the number of levels in the first filter; and identifying a filter column based on the data value and a number of filter columns in the first filter.

9. The system of claim 6, wherein the generating of the first filter further comprises:

merging one or more rows of the first filter based on a target false positive rate.

10. The system of claim 1, wherein:

each filter in the set of filters comprises a set of bloom filters; and the pruning index further comprises a plurality of columns, the plurality of columns comprising a partition identifier column, a slice number column, and the set of bloom filters.

11. The system of claim 10, further comprising:

clustering the pruning index based on the slice number column.

12. The system of claim 1, wherein the operations further comprise:

detecting a change to the source table;

generating one or more additional rows for the pruning index based on the change to the source table; and reclustering the pruning index based on slice numbers.

13. A method comprising:

organizing a source table into a set of partitions;

receiving a query directed to the source table organized into the set of partitions;

accessing, from a database, a pruning index associated with the source table, the pruning index comprising a set of filters that index distinct values in each column of the source table, each filter in the set of filters being represented as a two-dimensional array in the pruning index, each filter in the set of filters corresponding to one partition from the set of partitions; and processing the query using the pruning index, the processing of the query comprising:

identifying, using the pruning index, a sub-set of partitions to scan for data matching the query; and scanning only the sub-set of partitions of the source table to identify data matching the query.

14. The method of claim 13, wherein the processing of the query using the pruning index comprises:

generating a hash value based on an equality predicate included in the query;

identifying one or more values in the pruning index that match the hash value; and identifying one or more partitions that potentially satisfy the equality predicate based on the one or more values in the pruning index that match the hash value.

15. The method of claim 13, wherein the identifying of the sub-set of partitions to scan for the data matching the query comprises identifying one or more partitions in which data matching the query is not stored.

16. The method of claim 13, wherein the identifying of the sub-set of partitions to scan for the data matching the query comprises identifying one or more partitions in which data matching the query is potentially stored.

17. The method of claim 16, wherein:

each filter of the set of filters comprises multiple bloom filters, a number of bloom filters in each blocked bloom filter being based on a false positive rate constraint.

18. The method of claim 13, further comprising generating the pruning index, the generating of the pruning index comprising generating a first filter for a first partition of the set of partitions in the source table, the first filter indexing distinct values in each column of the first partition.

19. The method of claim 18, wherein the generating of the first filter comprises:

for a given data value, identifying a cell within the first filter based on the data value;

generating a hash value based on the data value; and populating the cell in the first filter using the hash value.

20. The method of claim 19, further comprising:

computing a number of levels in the first filter;

wherein the identifying of the cell comprises:

identifying a slice in the first filter based on the data value and the number of levels in the first filter; and identifying a filter column based on the data value and a number of filter columns in the first filter.

21. The method of claim 18, wherein the generating of the first filter further comprises:

merging one or more rows of the first filter based on a target false positive rate.

22. The method of claim 13, wherein:

each filter in the set of filters comprises a set of bloom filters; and the pruning index further comprises a plurality of columns, the plurality of columns comprising a partition identifier column, a slice number column, and the set of bloom filters.

23. The method of claim 13, further comprising:

detecting a change to the source table;

generating one or more additional rows for the pruning index based on the change to the source table; and reclustering the pruning index based on slice numbers.

24. A computer-storage medium comprising instructions that, when executed by one or more processors of a machine, configure the machine to perform operations comprising:

organizing a source table into a set of partitions;

receiving a query directed to the source table organized into the set of partitions;

accessing, from a database, a pruning index associated with the source table, the pruning index comprising a set of filters that index distinct values in each column of the source table, each filter in the set of filters being represented as a two-dimensional array in the pruning index, each filter in the set of filters corresponding to one partition from the set of partitions; and processing the query using the pruning index, the processing of the query comprising:

identifying, using the pruning index, a sub-set of partitions to scan for data matching the query; and scanning only the sub-set of partitions of the source table to identify data matching the query.

25. The computer-storage medium of claim 24, wherein the processing of the query using the pruning index comprises:

generating a hash value based on an equality predicate included in the query;

identifying one or more values in the pruning index that match the hash value; and identifying one or more partitions that potentially satisfy the equality predicate based on the one or more values in the pruning index that match the hash value.

26. The computer-storage medium of claim 24, wherein the identifying of the sub-set of partitions to scan for the data matching the query comprises identifying one or more partitions in which data matching the query is not stored.

27. The computer-storage medium of claim 25, wherein the identifying of the sub-set of partitions to scan for the data matching the query comprises identifying one or more partitions in which data matching the query is potentially stored.

28. The computer-storage medium of claim 24, wherein:

each filter of the set of filters comprises multiple bloom filters, a number of bloom filters in each blocked bloom filter being based on a false positive rate constraint.

29. The computer-storage medium of claim 24, wherein the operations further comprise generating the pruning index, the generating of the pruning index comprising generating a first filter for a first partition of the set of partitions in the source table, the first filter indexing distinct values in each column of the first partition.

30. The computer-storage medium of claim 29, wherein the generating of the first filter comprises:

for a given data value, identifying a cell within the first filter based on the data value;

generating a hash value based on the data value; and populating the cell in the first filter using the hash value.

* * * * *